United States Patent
Trika et al.

(10) Patent No.: US 10,915,267 B2
(45) Date of Patent: Feb. 9, 2021

(54) ATOMIC CROSS-MEDIA WRITES ON A STORAGE DEVICE

(71) Applicant: Intel Corporation, Santa Clara, CA (US)

(72) Inventors: Sanjeev N. Trika, Portland, OR (US); Peng Li, Beaverton, OR (US); Jawad B. Khan, Portland, OR (US); Myron Loewen, Berthoud, CO (US)

(73) Assignee: INTEL CORPORATION, Santa Clara, CA (US)

( * ) Notice: Subject to any disclaimer, the term of this patent is extended or adjusted under 35 U.S.C. 154(b) by 133 days.

(21) Appl. No.: 15/833,955

(22) Filed: Dec. 6, 2017

(65) Prior Publication Data

US 2019/0042152 A1    Feb. 7, 2019

(51) Int. Cl.
| G06F 3/06 | (2006.01) |
| H04L 29/08 | (2006.01) |
| G06F 11/07 | (2006.01) |

(52) U.S. Cl.
CPC .......... *G06F 3/0659* (2013.01); *G06F 3/0616* (2013.01); *G06F 3/0619* (2013.01); *G06F 3/0683* (2013.01); *G06F 11/0727* (2013.01); *H04L 67/1097* (2013.01)

(58) Field of Classification Search
None
See application file for complete search history.

(56) References Cited

U.S. PATENT DOCUMENTS

| 9,049,242 | B2 * | 6/2015 | Lubbers | G06F 3/061 |
| 10,140,149 | B1 * | 11/2018 | Hayes | G06F 13/16 |
| 10,141,050 | B1 * | 11/2018 | Kannan | G11C 11/5628 |
| 2004/0193781 | A1 * | 9/2004 | Chung | G06F 12/0246 |
| | | | | 711/103 |
| 2014/0281121 | A1 * | 9/2014 | Karamcheti | G06F 3/061 |
| | | | | 711/102 |
| 2014/0351506 | A1 * | 11/2014 | Santry | G06F 3/0619 |
| | | | | 711/114 |
| 2016/0139934 | A1 | 5/2016 | Sarangi et al. | |
| 2017/0185293 | A1 * | 6/2017 | Malikowski | G06F 12/0246 |
| 2017/0185354 | A1 | 6/2017 | Doshi et al. | |
| 2017/0286287 | A1 * | 10/2017 | Hady | G06F 12/0246 |

(Continued)

OTHER PUBLICATIONS

Extended European Search Report for Patent Application No. 18204209.3, dated Apr. 29, 2019, 7 pages.

*Primary Examiner* — Pierre Miche Bataille
*Assistant Examiner* — Ryan Dare
(74) *Attorney, Agent, or Firm* — Jaffery Watson Mendonsa & Hamilton LLP

(57) ABSTRACT

Examples include techniques for implementing a write transaction to two or more memory devices in a storage device. In some examples, the write transaction includes an atomic write transaction from an application or operating system executing on a computing platform to a storage device coupled with the computing platform. For these examples, the storage device includes a storage controller to receive an atomic multimedia write transaction request to write first data and second data; cause the first data to be stored in a first memory device, and cause the second data to be stored in a second memory device, simultaneously and atomically.

18 Claims, 10 Drawing Sheets

(56) References Cited

U.S. PATENT DOCUMENTS

| | | | |
|---|---|---|---|
| 2018/0024830 A1* | 1/2018 | Kannan | G06F 8/654 |
| | | | 711/104 |
| 2018/0260125 A1* | 9/2018 | Botes | G06F 3/0617 |
| 2018/0329650 A1* | 11/2018 | Guim Bernat | G06F 12/0815 |
| 2019/0073265 A1* | 3/2019 | Brennan | G06F 11/1076 |

* cited by examiner

ATOMIC CROSS-MEDIA WRITES ON A STORAGE DEVICE

TECHNICAL FIELD

Examples described herein are generally related to techniques for write transactions to a storage device.

BACKGROUND

In some examples, file systems, databases, or disk caches may be associated with different types of applications or an operating system (OS) in a computing system. For these examples, an application or OS may issue a transaction request such as a set of one or more write operations to a non-volatile memory (e.g., a write transaction) included in a storage device. The application or OS typically needs to ensure that the write transaction completes before issuing a next transaction. If a computing system needs to ensure that a write transaction is complete, the computing system may characterize operations associated with these types of write transactions as atomic write transactions.

When applications such file systems, databases, and disk caches update the data on a storage device, they must also update some metadata to allow for correct lookup/recovery of the data in the future. Many storage devices do not provide for atomic metadata per input/output (I/O) request, which results in requiring complex journaling or logging mechanisms and corresponding complex and expensive recovery methods for power loss handling. This requires additional I/O requests to be performed. In some computing environments, such journal/metadata writes may be combined to reduce additional I/O requests (e.g., writing them only on OS-flushes), however other scenarios (e.g., when users/admins disable volatile write buffering, commonly done in data center solutions) require an additional metadata write operation per data write operation. This doubles the number of write operations to the storage device, causing performance, power, and endurance degradation.

In some computing environments, applications or an OS may synthesize their respective needed atomicity guarantees for indivisibly writing arbitrarily sized and arbitrarily scattered data on an HDD or SSD by using one or more of known techniques like copy-and-update, journaling, ordered updates, two pass writes, sequenced additional metadata writes, etc. These techniques also generally double the number of write operations to a storage device and thus may significantly hurt both performance and endurance of the storage device.

Fused commands as described in the Non-Volatile Memory (NVM) Express standard (version 1.3, available at nvmexpress.org), are not sufficient to solve the problem. These fused commands do not guarantee all-or-none atomic behavior, require sequenced operations, and also must have the same logical block addresses (LBAs), which is generally not possible for such applications.

DETAILED DESCRIPTION

As contemplated in the present disclosure, applications or an OS associated with file-systems, databases, or disk caches may need to ensure that a write transaction to a storage device completes before issuing a next transaction. Ensuring the write transaction completes requires a logically atomic write transaction to provide data consistency for users of these applications or the OS. Logically atomic write transactions may allow for multiple operations to be grouped into a single logical entity that may enable these applications or the OS to either see all write transactions completed or none of the write transactions completed. In embodiments, in an atomic write transaction, data may be stored in one type of memory in a storage device and associated metadata may be stored in another type of memory in the storage device.

Figure 1:
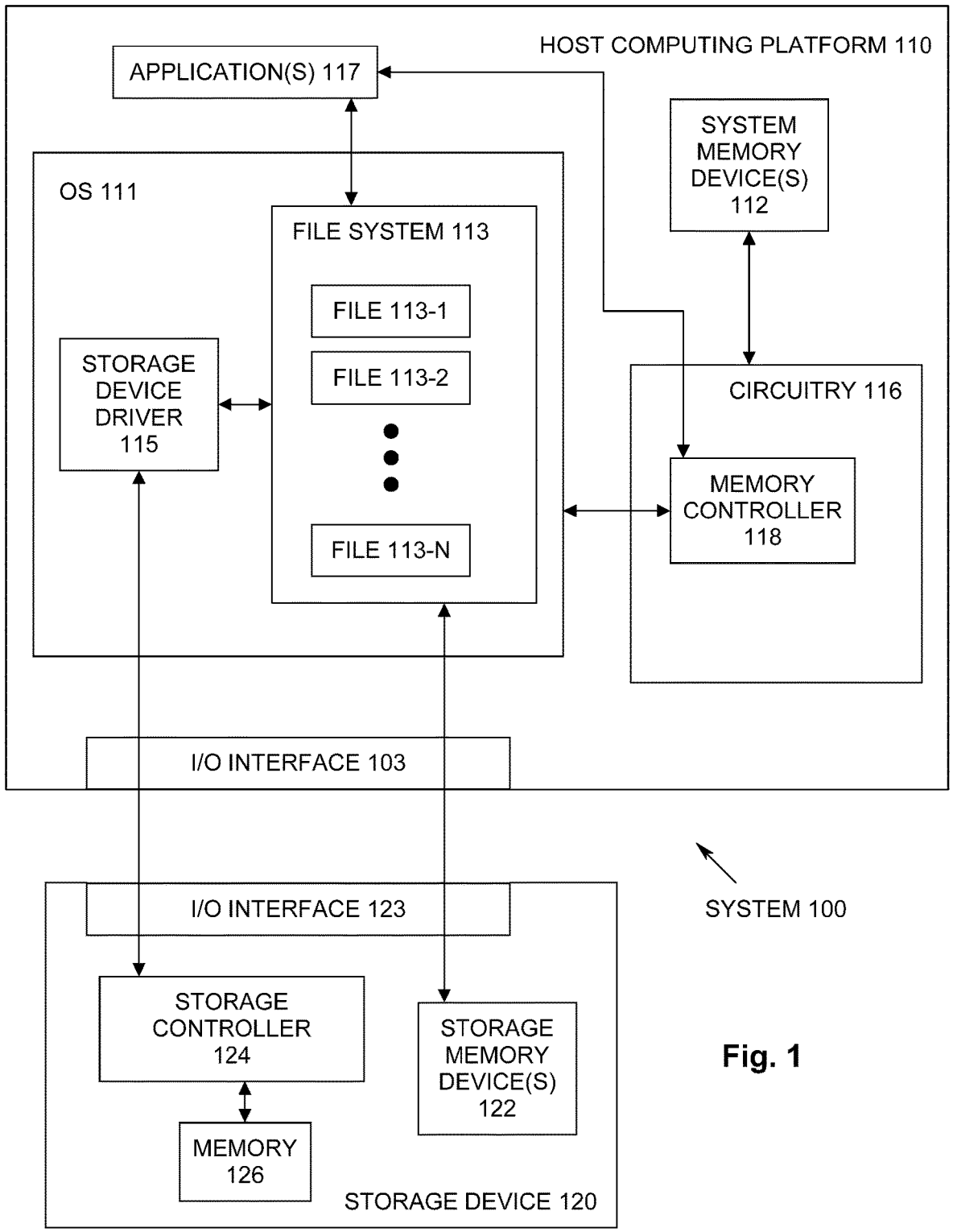
FIG. 1 illustrates an example first system.

FIG. 1 illustrates an example system 100. In some examples, as shown in FIG. 1, system 100 includes a host computing platform 110 coupled to a storage device 120 through I/O interface 103 and I/O interface 123. Also, as shown in FIG. 1, host computing platform 110 may include an OS 111, one or more system memory device(s) 112, circuitry 116 and one or more application(s) 117. For these examples, circuitry 116 may be capable of executing various functional elements of host computing platform 110 such as OS 111 and application(s) 117 that may be maintained, at least in part, within system memory device(s) 112. Circuitry 116 may include host processing circuitry to include one or more central processing units (CPUs) and associated chipsets and/or controllers.

According to some examples, as shown in FIG. 1, OS 111 may include a file system 113 and a storage device driver 115 and storage device 120 may include a storage controller 124, one or more storage memory device(s) 122 and memory 126. OS 111 may be arranged to implement storage device driver 115 to coordinate at least temporary storage of data for a file from among files 113-1 to 113-$n$, where "n" is any whole positive integer >1, to storage memory device(s) 122. The data, for example, may have originated from or may be associated with executing at least portions of application(s) 117 and/or OS 111. As described in more detail below, the OS 111 communicates one or more commands and transactions with storage device 120 to write data to storage device 120. The commands and transactions may be organized and processed by logic and/or features at the storage device 120 to implement an atomic write transaction to write the data to storage device 120.

In some examples, storage controller 124 may include logic and/or features to receive a write transaction request for an atomic write transaction to storage memory device(s) 122 at storage device 120. For these examples, the atomic write transaction may be initiated by or sourced from an application such as application(s) 117 that utilizes file system 113 to write data to storage device 120 through input/output (I/O) interfaces 103 and 123.

In some examples, memory 126 may include volatile types of memory including, but not limited to, RAM, D-RAM, DDR SDRAM, SRAM, T-RAM or Z-RAM. One example of volatile memory includes DRAM, or some variant such as SDRAM. A memory subsystem as described herein may be compatible with a number of memory technologies, such as DDR4 (DDR version 4, initial specification published in September 2012 by JEDEC), LPDDR4

(LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (LPDDR version 5, currently in discussion by JEDEC), HBM2 (HBM version 2, currently in discussion by JEDEC), and/or others, and technologies based on derivatives or extensions of such specifications.

However, examples are not limited in this manner, and in some instances, memory 126 may include non-volatile types of memory, whose state is determinate even if power is interrupted to memory 126. In some examples, memory 126 may include non-volatile types of memory that is a block addressable, such as for NAND or NOR technologies. Thus, a memory 126 can also include a future generation of types of non-volatile memory, such as a 3-dimensional cross-point memory (3D XPoint™ commercially available from Intel Corporation), or other byte addressable non-volatile types of memory. According to some examples, the memory 126 may include types of non-volatile memory that includes chalcogenide glass, multi-threshold level NAND flash memory, NOR flash memory, single or multi-level Phase Change Memory (PCM), a resistive memory, nanowire memory, FeTRAM, MRAM that incorporates memristor technology, or STT-MRAM, or a combination of any of the above, or other memory.

In some examples, storage memory device(s) 122 may be a device to store data from write transactions and/or write operations. Storage memory device(s) 122 may include one or more chips or dies having gates that may individually include one or more types of non-volatile memory to include, but not limited to, NAND flash memory, NOR flash memory, 3-D cross-point memory (3D XPoint™), ferroelectric memory, SONOS memory, ferroelectric polymer memory, FeTRAM, FeRAM, ovonic memory, nanowire, EEPROM, phase change memory, memristors or STT-MRAM. For these examples, storage device 120 may be arranged or configured as a solid-state drive (SSD). The data may be read and written in blocks and a mapping or location information for the blocks may be kept in memory 126.

Examples are not limited to storage devices arranged or configured as SSDs, other storage devices such as a hard disk drive (HDD) are contemplated. In these instances, the storage memory device (s) 122 may include one or more platters or rotating disks having a magnet material to store data.

According to some examples, communications between storage device driver 115 and storage controller 124 for data stored in storage memory devices(s) 122 and accessed via files 113-1 to 113-n may be routed through I/O interface 103 and I/O interface 123. I/O interfaces 103 and 123 may be arranged as a Serial Advanced Technology Attachment (SATA) interface to couple elements of host computing platform 110 to storage device 120. In another example, I/O interfaces 103 and 123 may be arranged as a Serial Attached Small Computer System Interface (SCSI) (or simply SAS) interface to couple elements of host computing platform 110 to storage device 120. In another example, I/O interfaces 103 and 123 may be arranged as a Peripheral Component Interconnect Express (PCIe) interface to couple elements of host computing platform 110 to storage device 120. In another example, I/O interfaces 103 and 123 may be arranged as a Non-Volatile Memory Express (NVMe) interface to couple elements of host computing platform 110 to storage device 120. For this other example, communication protocols may be utilized to communicate through I/O interfaces 103 and 123 as described in industry standards or specifications (including progenies or variants) such as the Peripheral Component Interconnect (PCI) Express Base Specification, revision 3.1, published in November 2014 ("PCI Express specification" or "PCIe specification") or later revisions, and/or the Non-Volatile Memory Express (NVMe) Specification, revision 1.2, also published in November 2014 ("NVMe specification") or later revisions.

In some examples, system memory device(s) 112 may store information and commands which may be used by circuitry 116 for processing information. Also, as shown in FIG. 1, circuitry 116 may include a memory controller 118. Memory controller 118 may be arranged to control access to data at least temporarily stored at system memory device(s) 112 for eventual storage to storage memory device(s) 122 at storage device 120.

In some examples, storage device driver 115 may include logic and/or features to forward commands associated with one or more write transactions and/or write operations originating from application(s) 117. For example, the storage device driver 115 may forward commands associated with atomic write transactions such that data may be caused to be stored to storage memory device(s) 122 at storage device 120. More specifically, storage device driver 115 can enable communication of the write operations from application(s) 117 at computing platform 110 to controller 124.

System Memory device(s) 112 may include one or more chips or dies having volatile types of memory such RAM, D-RAM, DDR SDRAM, SRAM, T-RAM or Z-RAM. However, examples are not limited in this manner, and in some instances, system memory device(s) 112 may include non-volatile types of memory, including, but not limited to, NAND flash memory, NOR flash memory, 3-D cross-point memory (3D XPoint™), ferroelectric memory, SONOS memory, ferroelectric polymer memory, FeTRAM, FeRAM, ovonic memory, nanowire, EEPROM, phase change memory, memristors or STT-MRAM.

According to some examples, host computing platform 110 may include, but is not limited to, a server, a server array or server farm, a web server, a network server, an Internet server, a work station, a mini-computer, a main frame computer, a supercomputer, a network appliance, a web appliance, a distributed computing system, a personal computer, a tablet computer, a smart phone, multiprocessor systems, processor-based systems, or combination thereof.

Figure 2:
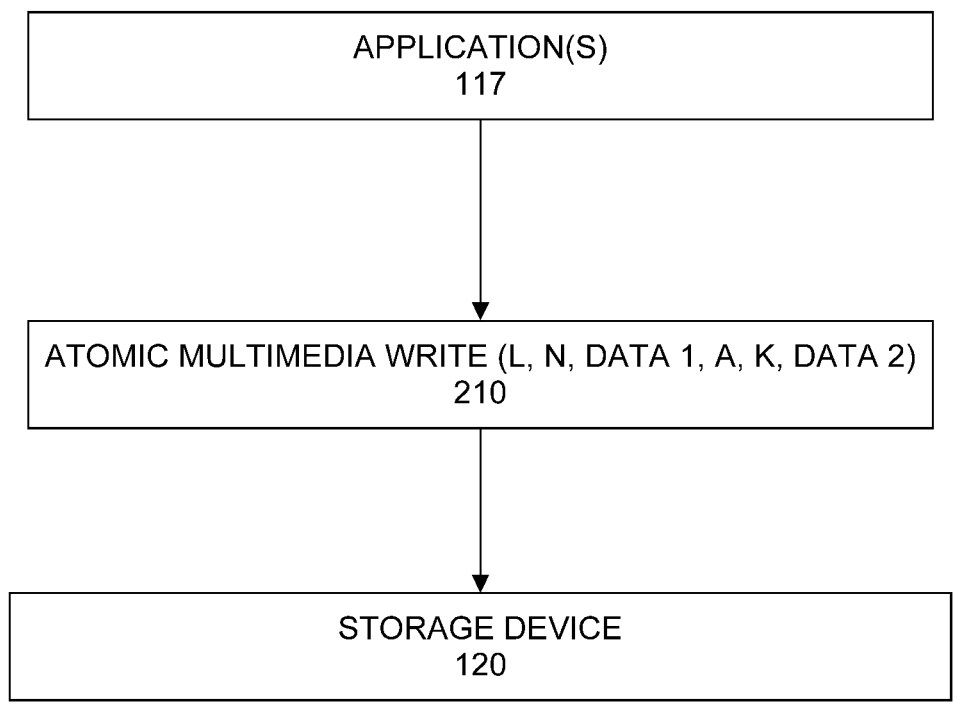
FIG. 2 illustrates an example first process.

FIG. 2 illustrates an example process. In some examples, process as shown in FIG. 2 depicts a process to implement an atomic write transaction. For these examples, this process may be implemented by or use components or elements of system 100 shown in FIG. 1 such as application(s) 117, OS 111, storage device 120, storage controller 124, memory 126, and/or storage memory device(s) 122. However, this process is not limited to being implemented by or use only these component or elements of system 100.

In embodiments of the present invention, a storage device 120 having multiple storage memory devices 122 (e.g., multiple media) may be extended to provide a write transaction that writes to two or more of the multiple media in the storage device simultaneously and atomically. In an embodiment, the storage memory devices 122 includes two or more non-volatile memories (NVMs). In an embodiment, a first NVM may be a NAND memory and a second NVM may be a power-protected DRAM memory. In an embodiment, the power-protected DRAM memory may comprise an Internal Memory Buffer (IMB). In an embodiment, primary user data such as cache lines (typically comprising multiple sectors) may be written to the first NVM, and metadata (such as cache metadata comprising multiple bytes) associated with the storage of the primary user data may be written to the second NVM. Multiple writes to either media may be combined. In some examples, at 210, a write transaction request called Atomic Multimedia Write may be sent or submitted by application(s) 117 via OS 111 and/or storage device driver 115 for an atomic write transaction to be handled by storage device 120. In embodiments, parameters of the Atomic Multimedia Write transaction comprise a starting logical block address (LBA) for a sector for storing user data in a first memory device ("L"), a number of sectors of user data ("N"), user data ("Data 1"), a starting address for storing associated metadata in a second memory device ("A"), a number of words of metadata to be stored ("K"), and the metadata ("Data 2"), although in other embodiments other parameter combinations may also be used.

Completion of the write request may be returned to the host application(s) 117 when all related writes are complete, with "all or none" behavior (i.e., the write transaction exhibits atomicity). In embodiments, a well-defined command start sequence, power loss imminent (PLI) power capability, and internal rollback capability may be used to ensure atomicity.

Embodiments of the present invention provide the benefits of atomic metadata support, while also leveraging the benefits of small granularity, fast media for storing the metadata.

While embodiments described herein show a storage device 120 with two storage memory devices 122, storage device 120 may be extended to M media types to provide atomic operations across any subset of the M media, wherein M is a natural number. Similarly, while some embodiments describe a context of a single logical block address (LBA) range being written to the first media, this may be extended in other embodiments to multiple ranges per media.

Figure 3:
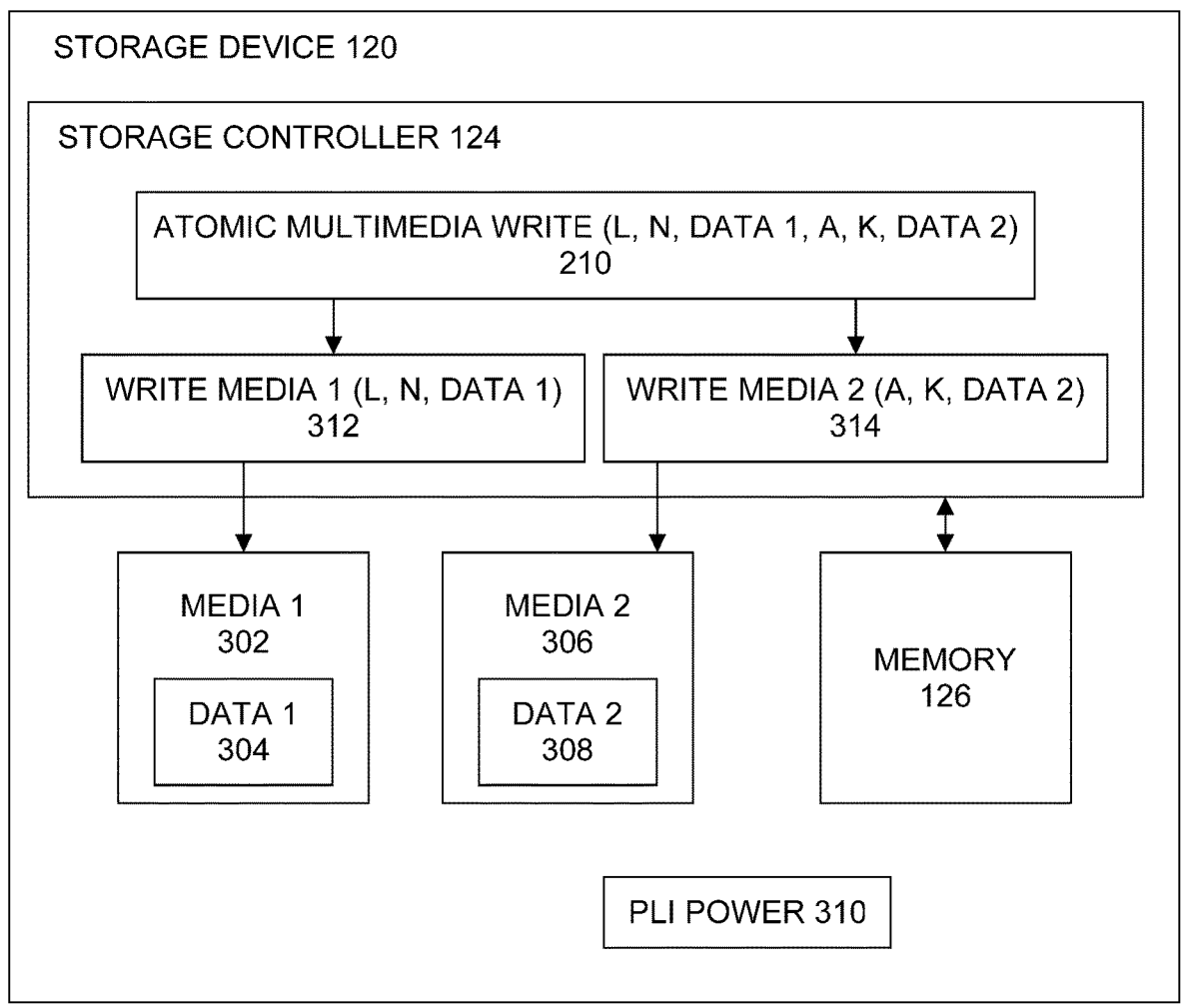
FIG. 3 illustrates an example second system.

FIG. 3 illustrates an example storage device 120. In an embodiment, storage device 120 includes media 1 302 and media 2 306. In an embodiment, media 1 302 may be a NAND NVM memory, and media 2 306 may be a 3D XPoint™ NVM memory. In other embodiments, additional NAND and/or DRAM and/or 3D XPoint™ memory may be added. In an embodiment, available data storage within media 1 302 may be exposed to application(s) 117 as a first namespace that has a write granularity of, for example, 512B sectors, and available data storage within media 2 306 may be exposed to application(s) 117 as a second namespace that has a write granularity of, for example, 4 KB double words. Other sizes may also be used. Embodiments of storage device 120 provide a command equivalent to "Write Media 1 (L, N, Data 1) that writes N sectors of Data 1 304 starting at sector L in the first namespace. Embodiments of storage device 120 also provide a command equivalent to "Write Media 2 (A, K, Data 2) that writes K double words of Data 2 308 starting at address A in the second namespace.

Embodiments of the present invention combine the two commands to provide a new command Atomic Multimedia Write (L, N, Data 1, A, K, Data 2) 210. The command instructs storage device 120 to do both the Write Media 1 and Write Media 2 operations simultaneously, while ensuring that either both succeed or both fail. That is, to implement the Atomic Multimedia Write (L, N, Data 1, A, K, Data 2) command 210, storage device atomically writes N sectors of Data 1 304 starting at sector L in the first namespace and writes K double words of Data 2 308 starting at address A in the second namespace. In an embodiment, Data 1 304 comprises user data and Data 2 308 comprises metadata relating to storage of Data 1 304.

If either write fails, data on Media 1 302 and data on Media 2 306 may be left unchanged for both of the address LBA and address ranges (in Media 1 302 and Media 2 306, respectively). In other embodiments, alternate schemes may be used to specify the atomic multimedia write operation, such as by using extensions to fused commands, or by using transaction IDs, with a difference being that in embodiments of the present invention the associated individual writes may refer to multiple media types. In other embodiments, other granularities and methods of exposing the data storage regions in the media may be used. In other embodiments, the Atomic Multimedia Write command may be exposed via NVMe or other protocol commands equivalent to the command described herein.

In embodiments, storage device 120 waits for both Data 1 304 and Data 2 308 buffers to be available in the storage device, e.g., for the appropriate corresponding direct memory accesses (DMAs) to complete. In an embodiment, the Atomic Multimedia Write command may be completed in a single DMA transfer. The storage device may then optionally return a completion indication of the atomic write transaction to storage device driver 115 at this time if the storage device has PLI power 310 protection capability. Storage device 120 executes Write Media 1 (L, N, Data 1) 312 and/or Write Media 2 (A, K, Data 2) 314 operations internally, and then may return completion indication of the atomic write command to storage device driver 115 if the storage device did not do so earlier. If the Write Media 1 (L, N, Data 1) 312 and/or the Write Media 2 (A, K, Data 2) 314 write operations are interrupted by a power loss event, then in an embodiment a PLI power 310 and/or a power loss recovery (PLR) scheme may be used to complete the write operations in a non-volatile manner.

In an embodiment, if storage device 120 does not have PLI power 310, storage device may not early complete the Atomic Multimedia Write request 210, and must wait for both Write Media 1 312 and Write Media 2 314 write operations to complete successfully to Media 1 302 and Media 2 306, respectively, before returning a success indicator to storage device driver 115. If storage device 120 returns a failure indicator (or if there is a power failure on a storage device without PLI power capability), then storage device 120 may roll back the writes of Write Media 1 312 and Write Media 2 314 using known roll back methods (such as internal journaling, for example).

Thus, in embodiment of the present invention, data may be written to first type of memory, and metadata associated with storing the data may be stored to a second type of memory simultaneously in an atomic operation.

Figure 4:
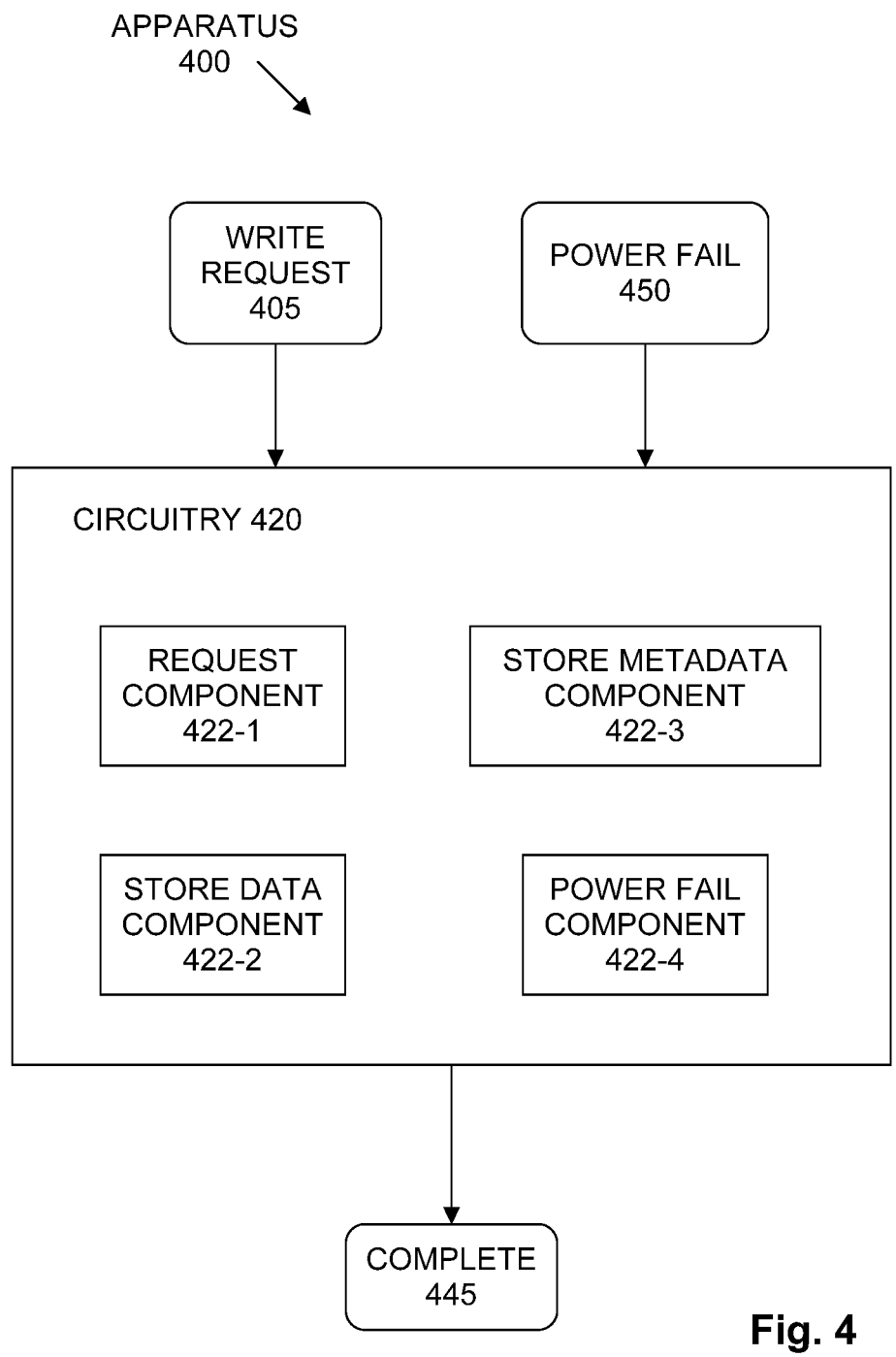
FIG. 4 illustrates an example block diagram for an apparatus.

FIG. 4 illustrates an example block diagram for an apparatus 400. Although apparatus 400 shown in FIG. 4 has a limited number of elements in a certain topology, it may be appreciated that the apparatus 400 may include more or less elements in alternate topologies as desired for a given implementation.

The apparatus 400 may be supported by circuitry 420 and apparatus 400 may be a storage controller maintained at a storage device such as storage controller 124 for storage device 120 of system 100 shown in FIG. 1. The storage device may be coupled to a host computing platform or device similar to host computing platform 110 also shown in FIG. 1. Also, as mentioned above, the storage device may include one or more memory devices or dies to store data associated with an Atomic Multimedia Write transaction request placed by one or more applications hosted by the host computing platform. Circuitry 420 may be arranged to execute one or more software or firmware implemented components or modules 422-a (e.g., implemented, at least in part, by a storage controller of a storage device). It is worthy to note that "a" and "b" and "c" and similar designators as used herein are intended to be variables representing any positive integer. Thus, for example, if an implementation sets a value for a=4, then a complete set of software or firmware for components or modules 422-a may include components 422-1, 422-2, 422-3, or 422-4. Also, these "components" may be software/firmware stored in computer-readable media, and although the components are shown in FIG. 4 as discrete boxes, this does not limit these components to storage in distinct computer-readable media components (e.g., a separate memory, etc.).

According to some examples, circuitry 420 may include a processor or processor circuitry. The processor or processor circuitry can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 420 may also include one or more application-specific integrated circuits (ASICs) and at least some components 422-a may be implemented as hardware elements of these ASICs.

According to some examples, apparatus 400 may include a request component 422-1. Request component 422-1 may be a logic and/or feature executed by circuitry 420 to receive a write request 405 for an Atomic Multimedia Write transaction to one or more storage memory devices. For these examples, the Atomic Multimedia Write transaction request may be included in write request 405 and the one or more storage memory devices may be located at the storage device that includes apparatus 400. Write request 405, for example, may have been sent from an application executing at a host computing device coupled with the storage device that includes apparatus 400.

In some examples, apparatus 400 may also include a store data component 422-2. Store component 422-2 may be a logic and/or feature executed by circuitry 420 to cause the data included in the Atomic Multimedia Write transaction to be stored to the one or more storage memory devices. In some examples, store component 422-2 may cause the data to be stored to physical memory addresses of the one or more storage memory devices of a first memory type.

In some examples, apparatus 400 may also include a store metadata component 422-3. Store component 422-3 may be a logic and/or feature executed by circuitry 420 to cause the metadata included in the Atomic Multimedia Write transaction to be stored to the one or more storage memory devices. In some examples, store component 422-3 may cause the metadata to be stored to physical memory addresses of the one or more storage memory devices of a second memory type. When circuitry 420 successfully completes the Atomic Multimedia Write transaction, circuitry 420 may return a complete status 445 to the requesting application.

According to some examples, apparatus 400 may also include a power-fail component 422-4. Power-fail component 422-4 may be a logic and/or feature executed by circuitry 420 to cause data and metadata stored to the one or more memory storage devices to be preserved or accessible following a detected power-fail event indicated in power-fail notice 450.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 5:
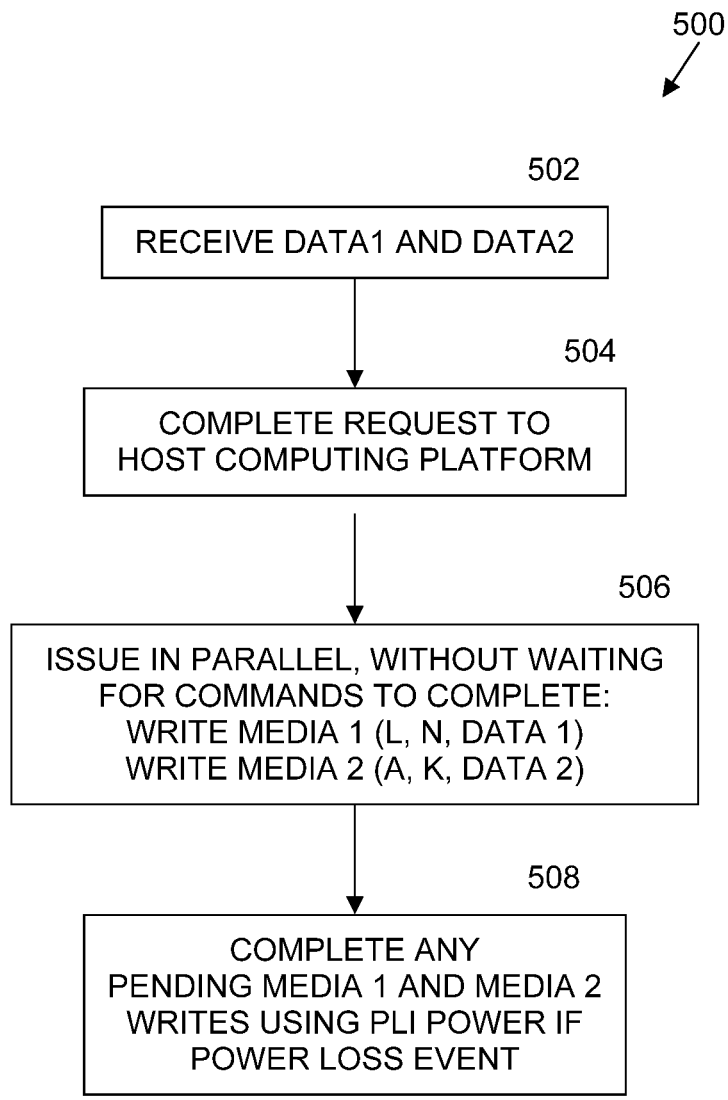
FIG. 5 illustrates an example of a first logic flow.

FIG. 5 illustrates an example of a first logic flow 500. Logic flow 500 may be representative of some or all of the operations executed by one or more logic, features, or devices described herein, such as apparatus 400. More particularly, logic flow 500 may be implemented by one or more of request component 422-1, store data component 422-2, store metadata component 422-3, and power fail component 422-4.

According to some examples, a storage controller for a storage device may receive a write transaction request for an Atomic Multimedia Write transaction 210 to the one or more storage memory devices, when storage device 120 provides sufficient PLI power 310. For these examples, request component 422-1 may receive the write transaction request for the Atomic Multimedia Write transaction. At block 502, data 1 304 and associated metadata data 2 308 may be received and stored into a transfer buffer in memory 126. At block 504, the request may be completed to the host computing platform. At block 506, commands to write media 1 (L, N, Data 1) 312 and to write media 2 (A, K, Data 2) 314 may be issued in parallel, without waiting for the commands to complete, using store data component 422-2 and store metadata component 422-3, respectively. At block 508, if a power loss event is received during execution of the write media 1 or write media 2 operations, any pending media 1 and media 2 write operations may be completed at least in part using PLI power 310 and power fail component 422-4.

Figure 6:
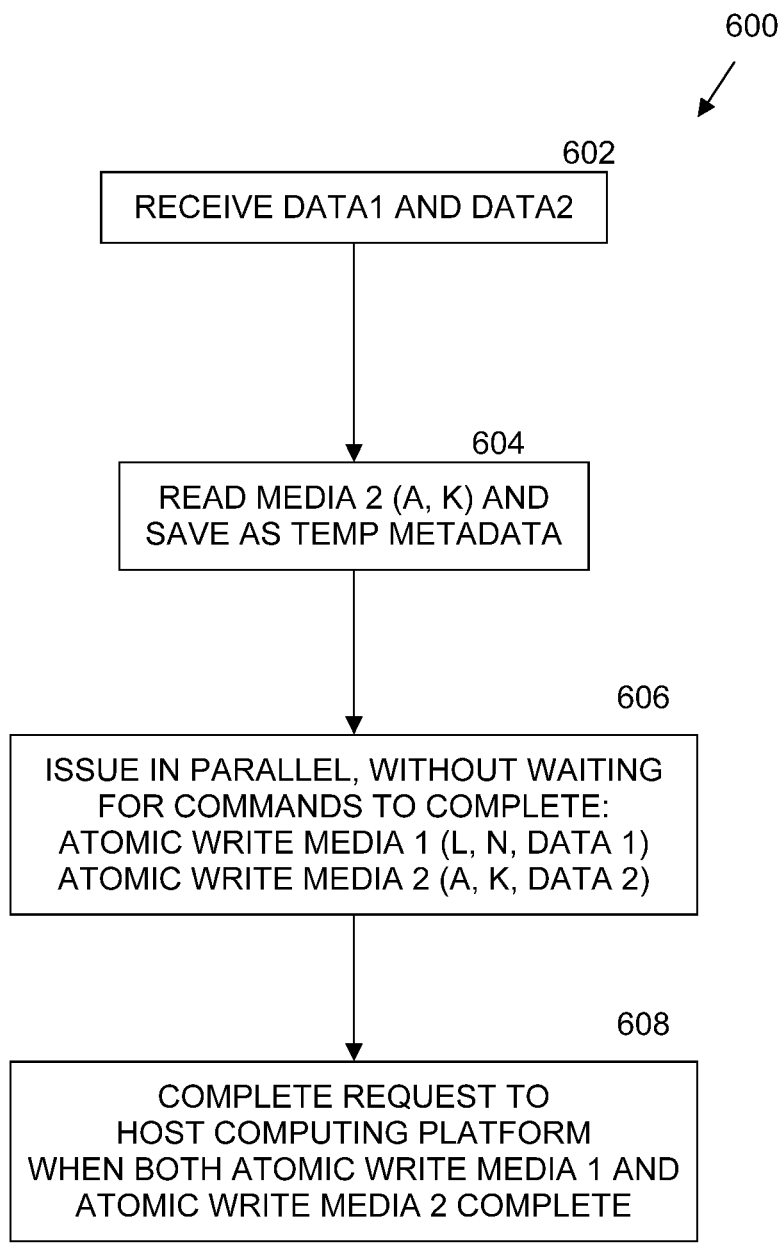
FIG. 6 illustrates an example of a second logic flow.

FIG. 6 illustrates an example of a second logic flow 600. Logic flow 600 may be representative of some or all of the operations executed by one or more logic, features, or devices described herein, such as apparatus 400. More particularly, logic flow 600 may be implemented by one or more of request component 422-1, store data component 422-2, store metadata component 422-3, and power fail component 422-4.

According to some examples, a storage controller for a storage device may receive a write transaction request for an Atomic Multimedia Write transaction 210 to the one or more storage memory devices, when storage device 120 provides minimal PLI power 310 and also supports atomic in-place write operations on individual media. For these examples, media 1 302 may be a NAND memory and media 2 306 may be a 3D XPoint™ memory. For these examples, Atomic Write Media 1 may be implemented using known rollback techniques and Atomic Write Media 2 may be implemented using minimal PLI power. Other implementations are possible. For these examples, request component 422-1 may receive the write transaction request for the Atomic Multimedia Write transaction. At block 602, data 1 304 and associated metadata data 2 308 may be received and stored into a transfer buffer in memory 126. At block 604, a read operation may be executed to get the metadata starting at address A and of length K from media 2 306 and store this metadata, for future use in case of a power loss event, as temporary metadata in memory 126. At block 606, commands to Atomic Write Media 1 (L, N, Data 1) 312 and to Atomic Write Media 2 (A, K, Data 2) 314 may be issued in parallel, without waiting for the commands to complete, using store data component 422-2 and store metadata component 422-3, respectively. At block 608, the request to the host computing platform may be completed when both Atomic Write Media 1 312 and Atomic Write Media 2 314 operations are complete.

Figure 7:
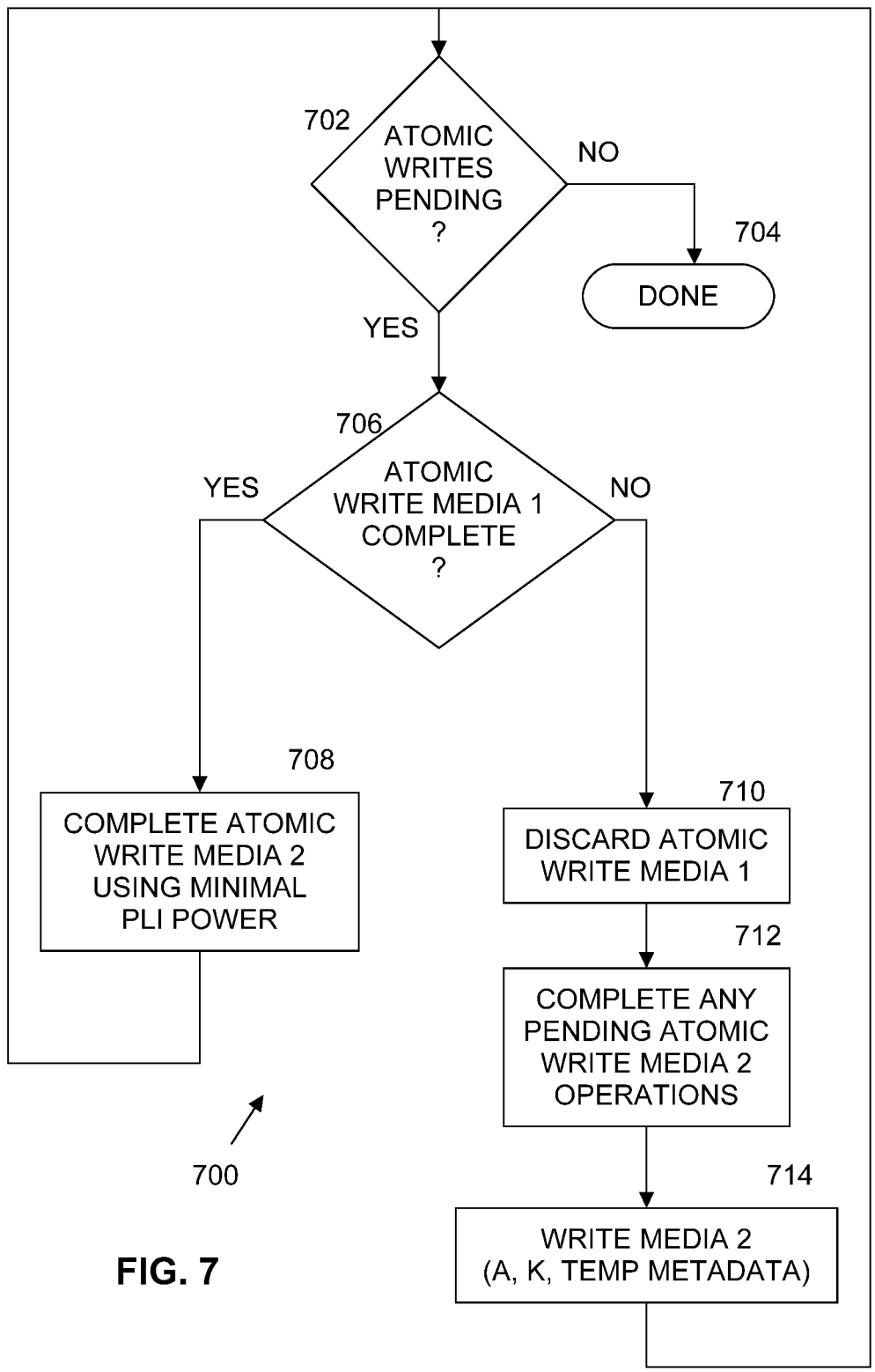
FIG. 7 illustrates an example of a third logic flow.

FIG. 7 illustrates an example of a third logic flow 700. Logic flow 700 may be representative of some or all of the operations executed by one or more logic, features, or devices described herein, such as apparatus 400. More particularly, logic flow 700 may be implemented by one or more of request component 422-1, store data component 422-2, store metadata component 422-3, and power fail component 422-4. Logic flow 700 illustrates processing by storage controller 120 when a power loss event is detected and communicated via power fail 450 during pending atomic writes.

At block 702 if no atomic write transactions are pending, no further power loss event processing is required, thereby ending processing at block 704. If there is at least one Atomic Multimedia Write transaction still pending, block 706 determines if an Atomic Write Media 1 operation 312 (part of the Atomic Multimedia Write transaction) is complete. If so, at block 708, a corresponding Atomic Write Media 2 operation 314 may be completed using minimal PLI power 310. Processing continues with block 702. If there is not an Atomic Write Media 1 operation 312 complete at block 706, then the following steps may be performed. At block 710, the Atomic Write Media 1 operation may be discarded (which may require a rollback on the next power-up of the storage device, if necessary). At block 712, any pending Atomic Write Media 2 operations may be completed. At block 714, a write media 2 operation may be performed to restore the temporary metadata obtained as described above in block 604 into media 2 306. Processing may continue with block 702.

Figure 8:
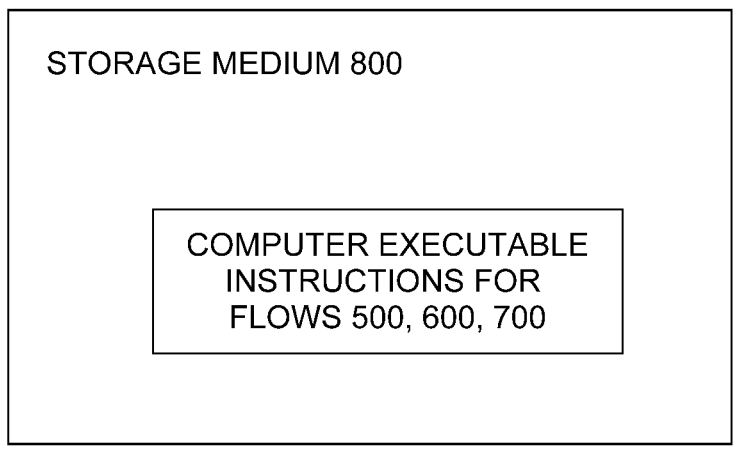
FIG. 8 illustrates an example storage medium.

FIG. 8 illustrates an example of a first storage medium. As shown in FIG. 6, the first storage medium includes a storage medium 800. The storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions to implement logic flows 500, 600, and 700. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
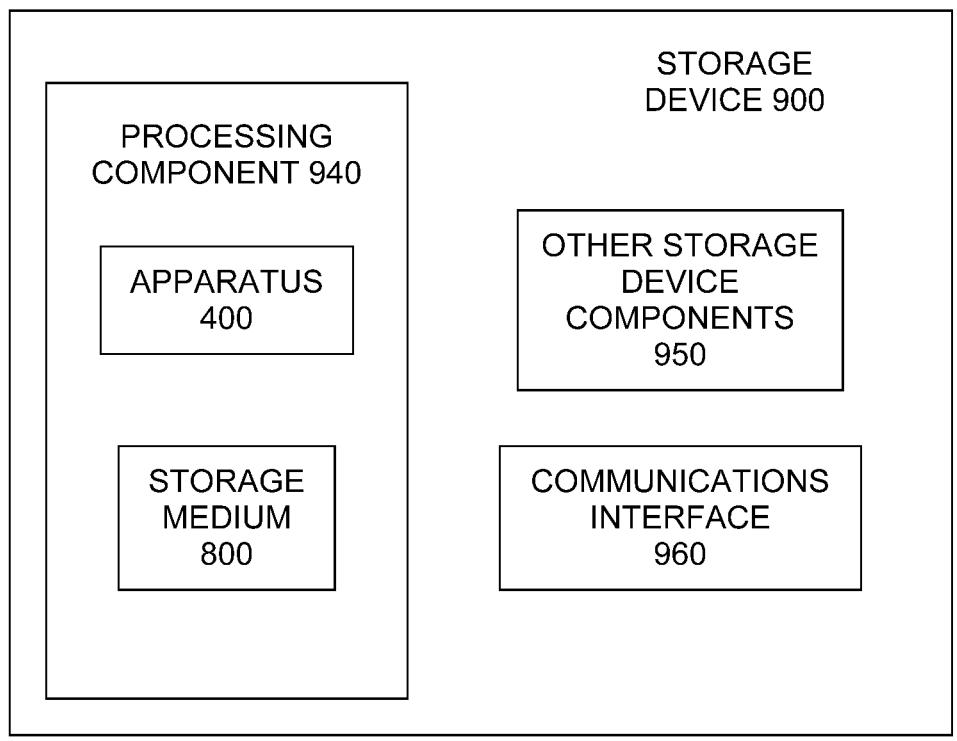
FIG. 9 illustrates an example storage device.

FIG. 9 illustrates an example storage device 900. In some examples, as shown in FIG. 9, storage device 900 may include a processing component 940, other storage device components 950 and a communications interface 960. According to some examples, storage device 900 may be capable of being coupled to a host computing device or platform.

According to some examples, processing component 940 may execute processing operations or logic for apparatus 400 and/or storage medium 800. Processing component 940 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, ASIC, programmable logic devices (PLD), digital signal processors (DSP), FPGA/programmable logic, memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software components, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other storage device components 950 may include common computing elements or circuitry, such as one or more processors, multi-core processors, co-processors, memory units, chipsets, controllers, interfaces, oscillators, timing devices, power supplies, and so forth. Examples of memory units may include without limitation various types of computer readable and/or machine readable storage media in the form of one or more higher speed memory units, such as read-only memory (ROM), RAM, DRAM, DDR DRAM, synchronous DRAM (SDRAM), DDR SDRAM, SRAM, programmable ROM (PROM), EPROM, EEPROM, flash memory, ferroelectric memory, SONOS memory, polymer memory such as ferroelectric polymer memory, nanowire, FeTRAM or FeRAM, ovonic memory, phase change memory, memristers, STT-MRAM, magnetic or optical cards, 3D XPoint™, and any other type of storage media suitable for storing information.

In some examples, communications interface 960 may include logic and/or features to support a communication interface. For these examples, communications interface 960 may include one or more communication interfaces that operate according to various communication protocols or standards to communicate over direct or network communication links. Direct communications may occur via use of communication protocols such as SMBus, PCIe, NVMe, QPI, SATA, SAS or USB communication protocols. Network communications may occur via use of communication protocols Ethernet, Infiniband, SATA or SAS communication protocols.

Storage device 900 may be arranged as an SSD or an HDD that may be configured as described above for storage device 120 of system 100 as shown in FIG. 1. Accordingly, functions and/or specific configurations of storage device 900 described herein, may be included or omitted in various embodiments of storage device 900, as suitably desired.

The components and features of storage device 900 may be implemented using any combination of discrete circuitry, ASICs, logic gates and/or single chip architectures. Further, the features of storage device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example storage device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Figure 10:
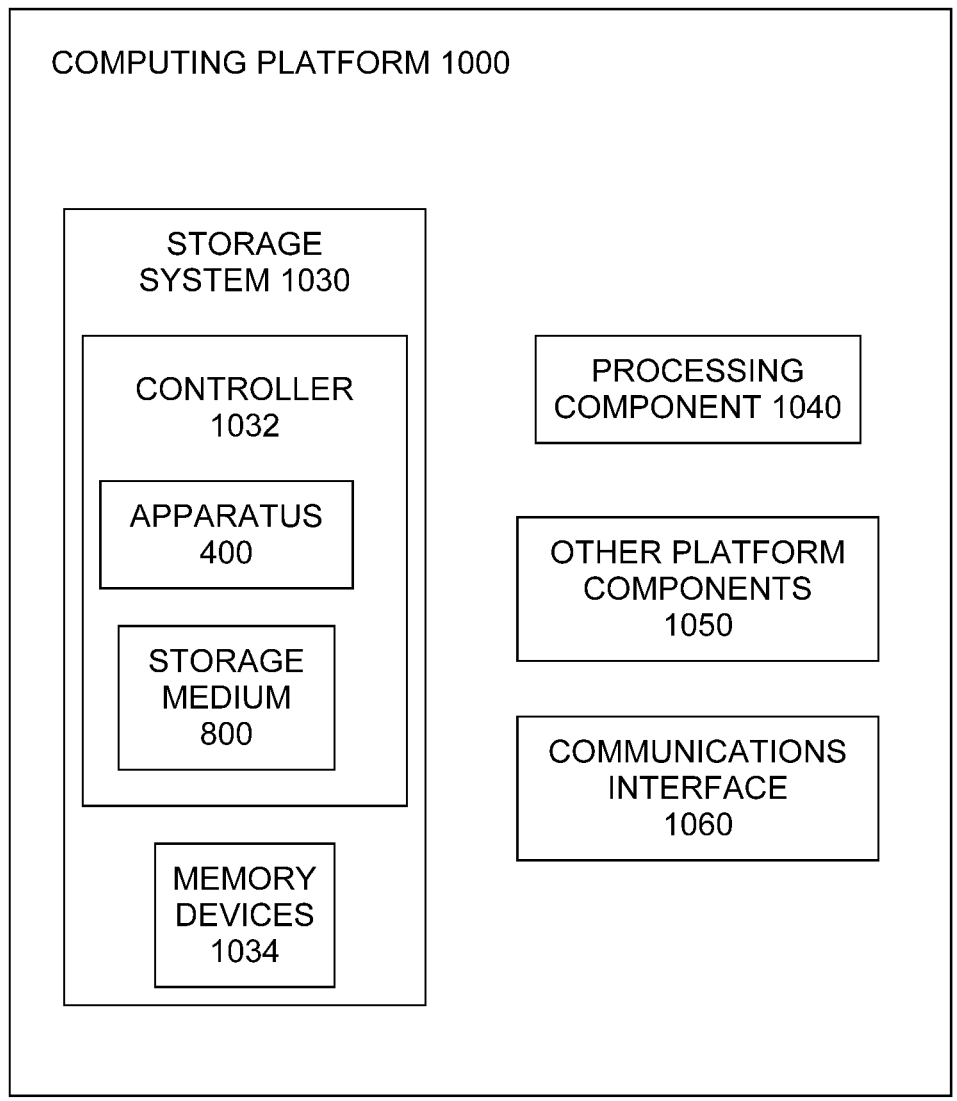
FIG. 10 illustrates an example computing platform.

FIG. 10 illustrates an example computing platform 1000. In some examples, as shown in FIG. 10, computing platform 1000 may include a storage system 1030, a processing component 1040, other platform components 1050 and a communications interface 1060. According to some examples, computing platform 1000 may be implemented in a computing device.

According to some examples, storage system 1030 may be similar to storage device 120 of system 100 as shown in FIG. 1 and storage device 900 as shown in FIG. 9, and includes a controller 1032 and memory devices 1034. For these examples, logic and/or features resident at or located at controller 1032 may execute at least some processing operations or logic for apparatus 400 and may include storage media that includes storage medium 800. Also, memory devices 1034 may include similar types of volatile or non-volatile memory (not shown) that are described above for storage device 120.

According to some examples, processing component 1040 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, ASIC, PLD, DSP, FPGA/programmable logic, memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1050 may include common computing elements, such as one or more processors, multi-core processors, co-processors, memory units, chipsets, controllers, peripherals, interfaces, oscillators, timing devices, video cards, audio cards, multimedia I/O components (e.g., digital displays), power supplies, and so forth. Examples of memory units associated with either other platform components 1050 or storage system 1030 may include without limitation, various types of computer readable and machine readable storage media in the form of one or more higher speed memory units, such as ROM, RAM, DRAM, DDRAM, SDRAM, SRAM, PROM, EPROM, EEPROM, flash memory, ferroelectric memory, SONOS memory, polymer memory such as ferroelectric polymer memory, nanowire, FeTRAM or FeRAM, ovonic memory, nanowire, EEPROM, phase change memory, memristers, STT-MRAM, 3D XPoint™, magnetic or optical cards, an array of devices such as RAID drives, solid state memory devices, SSDs, HDDs or any other type of storage media suitable for storing information.

In some examples, communications interface 1060 may include logic and/or features to support a communication interface. For these examples, communications interface 1060 may include one or more communication interfaces that operate according to various communication protocols or standards to communicate over direct or network communication links. Direct communications may occur through a direct interface via use of communication protocols or standards described in one or more industry standards (including progenies and variants) such as those associated with the SMBus specification, the PCIe specification, the NVMe specification, the SATA specification, SAS specification or the USB specification. Network communications may occur through a network interface via use of communication protocols or standards such as those described in one or more Ethernet standards promulgated by the IEEE. For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3").

Computing platform 1000 may be part of a computing device that may be, for example, user equipment, a computer, a personal computer (PC), a desktop computer, a laptop computer, a notebook computer, a netbook computer, a tablet, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 1000 described herein, may be included or omitted in various embodiments of computing platform 1000, as suitably desired.

The components and features of computing platform 1000 may be implemented using any combination of discrete circuitry, ASICs, logic gates and/or single chip architectures. Further, the features of computing platform 1000 may be implemented using microcontrollers, programmable logic arrays and/or microprocessors or any combination of the foregoing where suitably appropriate. It is noted that hardware, firmware and/or software elements may be collectively or individually referred to herein as "logic", "circuit" or "circuitry."

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, API, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1

An example apparatus comprising: two or more memory devices; and a storage controller that includes logic: receive an atomic multimedia write transaction request to write first data and second data; and cause the first data to be stored in a first memory device, and cause the second data to be stored in a second memory device, simultaneously and atomically.

Example 2

The apparatus of example 1, comprising the apparatus coupled with a host computing platform, wherein the source of the atomic multimedia write transaction request is at least one of an application and an operating system executing at the host computing platform.

Example 3

The apparatus of example 1, wherein the memory devices comprise non-volatile memories.

Example 4

The apparatus of example 3, wherein the first memory device comprises a NAND memory and the second memory device comprises a power-protected DRAM memory.

Example 5

The apparatus of example 3, wherein the first memory device comprises a NAND memory and the second memory device comprises a 3D XPoint™ memory.

Example 6

The apparatus of example 1, wherein the first data comprises primary user data and the second data comprises metadata associated with storage of the first data.

Example 7

The apparatus of example 1, wherein causing the first data to be stored in the first device comprises executing a first write media operation to cause the storing of the first data in a first namespace of a first granularity in the first memory device and wherein causing the second data to be stored in the second device comprises executing a second write media operation to cause the storing of the second data in a second namespace of a second granularity in the second memory device.

Example 8

The apparatus of example 1, further comprising a power loss imminent (PLI) power protection component to complete the atomic multimedia transaction request when power to the apparatus is interrupted.

Example 9

The apparatus of example 1, wherein the logic comprises: a request component to receive the atomic multimedia write transaction request to write first data and second data; a store data component to store the first data in the first memory device; a store metadata component to store the second data in the second memory device; and a power fail component to cause the first data and the second data to be preserved following a detected power fail event.

Example 10

An example method comprising: receiving, at a storage controller for a storage device, an atomic multimedia write transaction request to write first data and second data to first and second memory devices, respectively; sending an indication of completion of the atomic multimedia write transaction request to a source of the atomic multimedia write transaction request; and causing the first data to be stored in the first memory device and the second data to be stored in a second memory device, simultaneously and atomically.

Example 11

The method of example 10, comprising receiving a power loss event and wherein causing the first data to be stored in the first memory device and the second data to be stored in a second memory device, simultaneously and atomically, comprises storing the first data and the second data using at least in part a power loss imminent (PLI) power protection component.

Example 12

The method of example 10, wherein the storage device is coupled with a host computing platform, and wherein the source of the atomic multimedia write transaction request is at least one of an application and an operating system executing at the host computing platform.

Example 13

The method of example 10, wherein the first data comprises primary user data and the second data comprises metadata associated with storage of the first data.

Example 14

The method of example 10, wherein causing the first data to be stored in the first device comprises executing a first write media operation to cause the storing of the first data in a first namespace of a first granularity in the first memory device and wherein causing the second data to be stored in the second device comprises executing a second write media operation to cause the storing of the second data in a second namespace of a second granularity in the second memory device.

Example 15

An example system comprising: a processor for a host computing platform to execute one or more applications; and a storage device coupled with the host computing platform, the storage device including: two or more memory devices; and a storage controller that includes logic to: receive an atomic multimedia write transaction request to write first data and second data; and cause the first data to be stored in a first memory device, and cause the second data to be stored in a second memory device, simultaneously and atomically.

Example 16

The system of example 15, wherein a source of the atomic multimedia write transaction request is at least one of an application and an operating system executing at the host computing platform.

Example 17

The system of example 15, wherein the first memory device comprises a NAND memory and the second memory device comprises a power-protected DRAM memory.

Example 18

The system of example 15, wherein the first memory device comprises a NAND memory and the second memory device comprises a phase change memory.

Example 19

The system of example 15, further comprising a power loss imminent (PLI) power protection component to complete the atomic multimedia transaction request when power to the apparatus is interrupted.

Example 20

The system of example 15, wherein the logic comprises: a request component to receive the atomic multimedia write transaction request to write first data and second data; a store data component to store the first data in the first memory device; a store metadata component to store the second data in the second memory device; and a power fail component to cause the first data and the second data to be preserved following a detected power fail event.

Example 21

An example method comprising: receiving, at a storage controller for a storage device, an atomic multimedia write transaction request to write first data and second data to first and second memory devices, respectively; reading temporary metadata from the second memory device based at least in part on a starting address in a namespace of the second memory device and a number of words of the second data; causing the first data to be stored in the first memory device and the second data to be stored in a second memory device, simultaneously and atomically; and sending an indication of completion of the atomic multimedia write transaction request to a source of the atomic multimedia write transaction request when both the first data and the second data are stored.

Example 22

The method of example 21, comprising: receiving a power loss event while causing the first data to be stored in the first memory device and the second data to be stored in the second memory device, simultaneously and atomically; determining if the atomic multimedia write transaction is pending; determining if storage of the first data is complete when the atomic write transaction is pending; and sending an indication of completion of the atomic multimedia write transaction request to a source of the atomic multimedia write transaction request when storing of the first data is complete and the second data is stored, using at least in part a power loss imminent (PLI) power protection component.

Example 23

The method of example 21, further comprising, when storage of the first data is not complete: discarding the first data from the first memory device; sending an indication of completion of the atomic multimedia write transaction request to a source of the atomic multimedia write transaction request when storing of the second data is complete using at least in part a power loss imminent (PLI) power protection component; and storing the temporary metadata in the second memory device at the starting address.

Example 24

The method of example 21, wherein the first data comprises primary user data and the second data comprises metadata associated with storage of the first data.

Example 25

An example of at least one machine readable medium may include a plurality of instructions that in response to being executed by system at a storage device may cause the system to carry out a method according to any one of examples 10 to 15, and 21 to 24.

Example 26

An example apparatus may include means for performing the methods of any one of examples 10 to 15, and 21 to 24.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
    a block addressable NAND non-volatile memory device having a first write speed and a first namespace with a first write granularity;
    a byte addressable three-dimensional cross point (3DXP) non-volatile memory device having a second write speed faster than the first write speed and a second namespace with a second write granularity smaller than the first write granularity; and
    a storage controller that includes logic to:
        receive an atomic multimedia write transaction request to write user data and metadata associated with storage of the user data; and
        cause the user data to be stored in the block addressable NAND non-volatile memory device, cause the metadata to be stored in the byte addressable 3DXP non-volatile memory device, simultaneously and atomically, and cause roll back of storage of the user data and the metadata when storage of the user data or storage of the metadata indicates a failure or when a power failure occurs for at least one of the block addressable NAND non-volatile memory device without a power loss imminent (PLI) capability and the byte addressable 3DXP non-volatile memory device without a PLI capability.

2. The apparatus of claim 1, comprising the apparatus coupled with a host computing platform, wherein the source of the atomic multimedia write transaction request is at least one of an application and an operating system executing at the host computing platform.

3. The apparatus of claim 1, further comprising a power loss imminent (PLI) power protection component to complete the atomic multimedia write transaction request when power to the apparatus is interrupted.

4. The apparatus of claim 1, wherein the logic comprises:
    a request component to receive the atomic multimedia write transaction request to write the user data and the meta data;
    a store data component to store the user data in the block addressable NAND non-volatile memory device;
    a store metadata component to store the metadata in the byte addressable 3DXP non-volatile memory device; and
    a power fail component to cause the user data and the metadata to be preserved following a detected power fail event.

5. A method comprising:
    receiving, at a storage controller for a storage device, an atomic multimedia write transaction request to write user data to a block addressable NAND non-volatile memory device having a first write speed and a first namespace with a first write granularity and metadata to a byte addressable three-dimensional cross point (3DXP) non-volatile memory device having a second write speed faster than the first write speed and a second namespace with a second write granularity smaller than the first write granularity;
    sending an indication of completion of the atomic multimedia write transaction request to a source of the atomic multimedia write transaction request; and
    causing the user data to be stored in the block addressable NAND non-volatile memory device and the metadata to be stored in the byte addressable three-dimensional cross point (3DXP) non-volatile memory device, simultaneously and atomically, and causing roll back of storage of the user data and the metadata when storage of the user data or storage of the metadata indicates a failure or when a power failure occurs for at least one of the block addressable NAND non-volatile memory device without a power loss imminent (PLI) capability and the byte addressable 3DXP non-volatile memory device without a PLI capability.

6. The method of claim 5, comprising receiving a power loss event and wherein causing the user data to be stored in the block addressable NAND non-volatile memory device and the metadata to be stored in the byte addressable three-dimensional cross point (3DXP) non-volatile memory device, simultaneously and atomically, comprises storing the user data and the metadata using at least in part a power loss imminent (PLI) power protection component.

7. The method of claim 5, wherein the storage device is coupled with a host computing platform, and wherein the source of the atomic multimedia write transaction request is at least one of an application and an operating system executing at the host computing platform.

8. A system comprising:
a processor for a host computing platform to execute one or more applications; and
a storage device coupled with the host computing platform, the storage device including:
a block addressable NAND non-volatile memory device having a first write speed and a first namespace with a first write granularity;
a byte addressable three-dimensional cross point (3DXP) non-volatile memory device having a second write speed faster than the first write speed and a second namespace with a second write granularity smaller than the first write granularity; and
a storage controller that includes logic to:
receive an atomic multimedia write transaction request to write user data and metadata associated with storage of the user data; and
cause the user data to be stored in block addressable NAND non-volatile memory device, cause the metadata to be stored in the byte addressable three-dimensional cross point (3DXP) non-volatile memory device, simultaneously and atomically, and cause roll back of storage of the user data and the metadata when storage of the user data or storage of the metadata indicates a failure or when a power failure occurs for at least one of the block addressable NAND non-volatile memory device without a power loss imminent (PLI) capability and the byte addressable 3DXP non-volatile memory device without a PLI capability.

9. The system of claim 8, wherein a source of the atomic multimedia write transaction request is at least one of an application and an operating system executing at the host computing platform.

10. The system of claim 8, further comprising a power loss imminent (PLI) power protection component to complete the atomic multimedia write transaction request when power to the storage device is interrupted.

11. The system of claim 8, wherein the logic comprises:
a request component to receive the atomic multimedia write transaction request to write user data and metadata;
a store data component to store the user data in the block addressable NAND non-volatile memory device memory device;
a store metadata component to store the metadata in the byte addressable three-dimensional cross point (3DXP) non-volatile memory device; and
a power fail component to cause the user data and the metadata to be preserved following a detected power fail event.

12. At least one non-transitory machine-readable medium comprising a plurality of instructions that in response to being executed by a system at a computing platform cause the system to:
receive, at a storage controller for a storage device, an atomic multimedia write transaction request to write user data to a block addressable NAND non-volatile memory device having a first write speed and a first namespace with a first write granularity and metadata to a byte addressable three-dimensional cross point (3DXP) non-volatile memory device having a second write speed faster than the first write speed and a second namespace with a second write granularity smaller than the first write granularity;
send an indication of completion of the atomic multimedia write transaction request to a source of the atomic multimedia write transaction request; and
cause the user data to be stored in the block addressable NAND non-volatile memory device and the metadata to be stored in byte addressable three-dimensional cross point (3DXP) non-volatile memory device, simultaneously and atomically, and cause roll back of storage of the user data and the metadata when storage of the user data or storage of the metadata indicates a failure or when a power failure occurs for at least one of the block addressable NAND non-volatile memory device without a power loss imminent (PLI) capability and the byte addressable 3DXP non-volatile memory device without a PLI capability.

13. The at least one non-transitory machine readable medium of claim 12, further comprising instructions to receive a power loss event and wherein instructions to cause the user data to be stored in the block addressable NAND non-volatile memory device and the metadata to be stored in byte addressable three-dimensional cross point (3DXP) non-volatile memory device, simultaneously and atomically, comprises instructions to store the user data and the metadata using at least in part a power loss imminent (PLI) power protection component.

14. A method comprising:
receiving, at a storage controller for a storage device, an atomic multimedia write transaction request to write user data to a block addressable NAND non-volatile memory device having a first write speed and a first namespace with a first write granularity and metadata associated with storage of the user data to a byte addressable three-dimensional cross point (3DXP) non-volatile memory device having a second write speed faster than the first write speed and a second namespace with a second write granularity smaller than the first write granularity;
reading temporary metadata from the byte addressable 3DXP non-volatile memory device based at least in part on a starting address in the second namespace and a number of words of the metadata;
causing the user data to be stored in the block addressable NAND non-volatile memory device and the metadata to be stored in the byte addressable 3DXP memory device, simultaneously and atomically, and causing roll back of storage of the user data and the metadata when storage of the user data or storage of the metadata indicates a failure or when a power failure occurs for at least one of the block addressable NAND non-volatile memory device without a power loss imminent (PLI) capability and the byte addressable 3DXP non-volatile memory device without a PLI capability; and sending an indication of completion of the atomic multimedia write transaction request to a source of the atomic multimedia write transaction request when both the user data and the metadata are stored.

15. The method of claim 14, comprising:

receiving a power loss event while causing the user data to be stored in the block addressable NAND non-volatile memory device and the metadata to be stored in the byte addressable 3DXP non-volatile memory device, simultaneously and atomically;

determining if the atomic multimedia write transaction is pending;

determining if storage of the user data is complete when the atomic multimedia write transaction is pending; and sending an indication of completion of the atomic multimedia write transaction request to a source of the atomic multimedia write transaction request when storing of the user data is complete and the metadata is stored, using at least in part a power loss imminent (PLI) power protection component.

16. The method of claim 15, further comprising, when storage of the user data is not complete:

discarding the user data from the block addressable NAND non-volatile memory device;

sending an indication of completion of the atomic multimedia write transaction request to a source of the atomic multimedia write transaction request when storing of the metadata is complete using at least in part a power loss imminent (PLI) power protection component; and storing the temporary metadata in the byte addressable 3DXP non-volatile memory device at the starting address.

17. At least one non-transitory machine-readable medium comprising a plurality of instructions that in response to being executed by a system at a computing platform cause the system to:

receiving, at a storage controller for a storage device, an atomic multimedia write transaction request to write user data to a block addressable NAND non-volatile memory device having a first write speed and a first namespace with a first write granularity and second metadata associated with storage of the user data to a byte addressable three-dimensional cross point (3DXP) non-volatile memory device having a second write speed faster than the first write speed and a second namespace with a second write granularity smaller than the first write granularity;

reading temporary metadata from the byte addressable 3DXP non-volatile memory device based at least in part on a starting address in a namespace of the byte addressable 3DXP non-volatile memory device and a number of words of the metadata;

causing the user data to be stored in the block addressable NAND non-volatile memory device and the metadata to be stored in byte addressable 3DXP non-volatile memory device, simultaneously and atomically, and causing roll back of storage of the user data and the metadata when storage of the user data or storage of the metadata indicates a failure or when a power failure occurs for at least one of the block addressable NAND non-volatile memory device without a power loss imminent (PLI) capability and the byte addressable 3DXP non-volatile memory device without a PLI capability; and sending an indication of completion of the atomic multimedia write transaction request to a source of the atomic multimedia write transaction request when both the user data and the metadata are stored.

18. The at least one non-transitory machine-readable medium of claim 17, further comprising instructions to:

receive a power loss event while causing the user data to be stored in the block addressable NAND non-volatile memory device and the metadata to be stored in the byte addressable 3DXP non-volatile memory device, simultaneously and atomically;

determine if the atomic multimedia write transaction is pending;

determine if storage of the user data is complete when the atomic multimedia write transaction is pending; and send an indication of completion of the atomic multimedia write transaction request to a source of the atomic multimedia write transaction request when storing of the user data is complete and the metadata is stored, using at least in part a power loss imminent (PLI) power protection component.

* * * * *